Figures 2, 3:
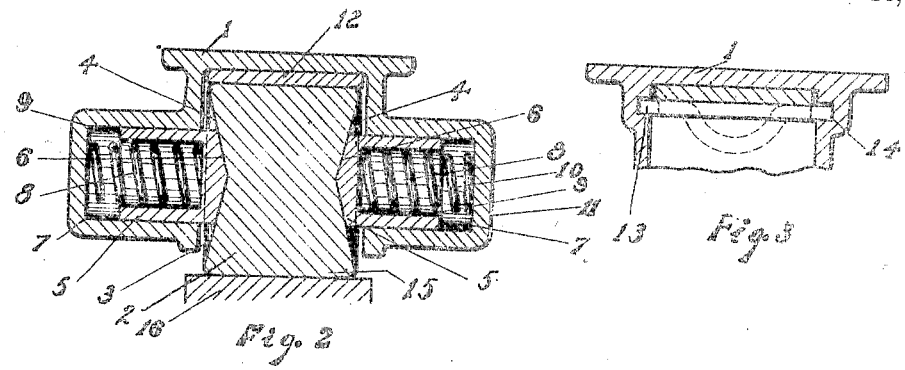

T. H. SYMINGTON.
SIDE BEARING.
APPLICATION FILED NOV. 19, 1912.

1,116,645.

Patented Nov. 10, 1914.

WITNESSES:
Thorvald A. Lee
E. M. Meredith

INVENTOR.
Thomas H. Symington
BY Stuart & Stuart
ATTORNEYS

UNITED STATES PATENT OFFICE.

THOMAS H. SYMINGTON, OF BALTIMORE, MARYLAND.

SIDE BEARING.

1,116,645.

Specification of Letters Patent.

Patented Nov. 10, 1914.

Application filed November 19, 1912. Serial No. 732,200.

*To all whom it may concern:*

Be it known that I, THOMAS H. SYMINGTON, a citizen of the United States of America, residing at the city of Baltimore, State of Maryland, have invented certain new and useful Improvements in Side Bearings, of which the following is a specification.

This invention relates to anti-friction side bearings for railway passenger or freight cars.

Bearings of the type of that which forms the subject-matter of this invention are placed between the car body and the truck on each side of the center bearing to reduce the friction between the truck and body in rounding bends or otherwise changing direction to conform to the line of the rails. These bearings have been made in various types and styles, as sliding, roller, etc.

The roller bearings of the type to which the device of the present invention belongs, ordinarily consist of a socket or housing secured to the bottom of the car with its opening downward, the socket being considerably elongated in the direction of the length of the car or more particularly on an arc concentric with the center bearing. Mounted in the socket with its axis extending transversely thereof and transversely of the car, is an anti-friction roller adapted to roll back and forth in the housing as the truck swings back and forth about its center bearing relatively to the car body. The roller or anti-friction member actually takes its bearing on the bottom of the housing and on the truck, or on suitable flat bearing plates at both points. These plates receive the pressure of the roller as it moves back and forth, and reduce wear and friction. It will be understood that neglecting the surface slip of the roll it must move back and forth in the housing a distance equal to that which it moves over the truck, and hence equal to the length of the arc which the point on the truck at which the bearing is located, swings relatively to the car body. Occasionally the roll reaches or approaches the end of the housing and must be moved back toward the center or become and remain cramped against rotation for a greater or less period. Ordinarily the oscillations of the truck about its center bearing in a horizontal plane are so slight, that the length of this arc is not greater than the length of the bearing socket or housing, but even under these circumstances, and particularly in making sharp curves, it is necessary to return the roller to the center of the socket at short intervals.

To this end, in accordance with the present invention, means is provided by which a force is continuously applied to the roll tending to maintain it in or return it to the center of the socket. The force applied is not sufficient to overcome the friction resulting from the pressure of the car body on the roll, but the relative motion of the truck and car body consists not only in oscillation of the truck about its center bearing in a horizontal plane but also rocking of the car relatively to the truck in a lateral vertical plane. Thus the car rests on each side bearing, not continuously, but at intervals, and between these intervals the roller is released and permitted to return to normal position, propelled by the force to which reference has been made.

In the preferred form of the invention each end of the roller is cupped or more particularly, provided with a central depression. Mounted on each side of the bearing socket and having their axes alined with the axis of the roll in central or normal position, are spring-pressed pins having ends to coöperate with the sockets. Preferably the sockets and the ends of the pins are conical. In the normal position of the roll the pins occupy the center of the conical depression on each side, forming a cone bearing, and springs are provided which tend to move the pins inward toward the center of the roll. The spring-pressed pins, acting with their conical faces on the conically depressed surface of the roll at each end, tend to maintain the roll in the center of the socket or housing, and when it leaves this position, owing to oscillation of the truck in a horizontal plane, the spring-pressed pins exert a continuous tendency to return the roll to normal position, and when the car rocks or swings in a vertical transverse plane relatively to the truck, removing the pressure from one bearing, the roll in that bearing is released and moves back to its normal position, propelled by the cam action of the spring-pressed pins on the depressed conical surfaces of the roll.

In the accompanying drawing I have illustrated a roller side bearing for railway cars constructed in accordance with the preferred form of my invention.

Figure 1:
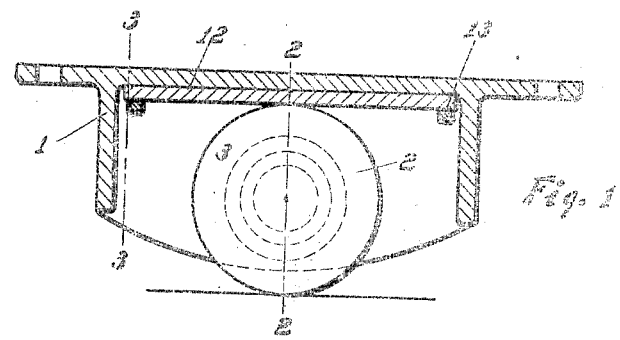
Figure 4:
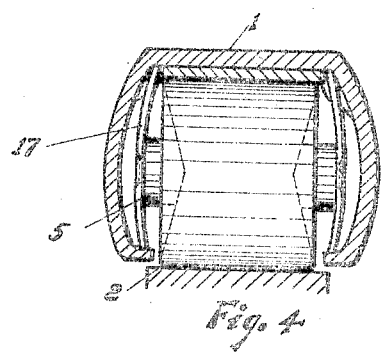

Figure 1 is a vertical, central, longitudinal section through the socket or housing, showing the roller in elevation. Fig. 2 is a transverse, central section through the socket, the roll, the bearing plates, the pins and the springs showing also the pin sockets. Fig. 3 is a detailed section taken near one end, showing the bearing plate and means for retaining and supporting it, and this retaining bar is shown in dotted lines in the position it takes just prior to being seated. Fig. 4 is a transverse section of a modified form of the device.

Referring to the drawing by numerals applied to the different parts, the device consists of a socket or housing casting 1 adapted to be secured to the bottom of the car body or to the truck if desired. The socket, as shown, is elongated in the direction of the length of the car, i. e., in a direction at right angles to the axis of the roll 2. The latter is seated in the socket with its axis at right angles to the length of the car and of the socket. The end or circular faces 3 of the roll, as shown, are cupped, i. e., they are depressed preferably in the form of an obtuse cone. Coöperating with these conical depressions 4, 4 are centering pins 5, 5 having end faces 6, preferably conical, formed to coöperate with the conical cups or depressions 4. These pins are mounted in cylindrical bearing sockets 7 on each side of the box, the axes of which sockets coincide with the axis of the roller in normal or central position. The pins, as shown, are made hollow, i. e., they are provided with central spring pockets 8 extending inward from their bases 9 or ends remote from the roller, and mounted in these spring pockets are spiral springs 10 engaging the forward ends of the spring pockets, and at the rear, engaging the outer walls 11 of the bearing sockets 7.

The spiral springs tend to force the pins inward and press the conical faces 6 against the conical depressions 4 of the ends of the rollers with a resulting cam or wedge action which exerts a continued tendency to maintain the roller in normal or central position, or return it thereto when it leaves this position.

The upper element of the roller engages a bearing plate 12 mounted within the socket or housing. Preferably, this bearing plate, which is composed of steel, is inserted into the housing from below so it is inclosed on its four end edges or surfaces by the side walls of the housing. The plate is supported by cross-bars 13 which, as shown in Fig. 3, are sprung into recesses or pockets 14 formed in the sides of the bearing socket to receive them. The lower element of the roller surface 15 bears on a plate or other flat bearing surface 16 provided for this purpose. As shown, the socket portion 1 is secured to the bottom of the car body, while the bearing plate 16 is secured to the truck, but this relation may, of course, be changed without departure from the invention.

In Fig. 4 I have illustrated a modified form of the device. Instead of the sockets and the spiral springs 10, the centering pins 5 are mounted on spring plates 17, seated in the sides of the box or roll socket, and, as shown, extending from end to end and top to bottom of these side walls. However, these plate springs may be otherwise formed. The springs give the pins an inward thrust with a resulting tendency to center the roller as hereinbefore described in regard to the preferred form.

The operation of the device is apparent from the description and drawing. As the truck oscillates in a horizontal plane relatively to the center bearing, the point on the truck, where the side bearing is located, moves through a considerable arc relatively to the car body and the roller moves a corresponding distance from the center of its socket rolling over the two bearing plates 12 and 16 provided for this purpose. The roller may reach the end of its socket or be displaced from its center by a lesser distance, and the function of this device is to prevent cramping of the roller in the end of its socket. When the car rocks or oscillates in a vertical transverse plane, moving away from the particular side of the bearing in question, and removing its weight from that side bearing, the roller therein is released and the springs, tending to force the centering pins inward, exert a wedging or cam action through the pins on the conical, depressed surfaces of the ends of the roller. Thus the roller is returned to normal position and made ready to again receive the weight of the car to take up friction during the next oscillation of the truck.

I have thus described specifically a preferred embodiment of my invention in order that its nature and operation may be clearly understood. However, the specific terms herein are used in their descriptive rather than in their limiting sense and the scope of the invention is defined in the claims.

I claim—

1. A side bearing consisting of a housing, a roller seated therein, the roller having bearings including a cupped end surface, a centering pin engaging the cup, a spring acting on the centering pin tending to force it inward and thereby to maintain the roller near the center of the housing and return it to central position when displaced.

2. A side bearing consisting of an elongated housing, a roller extending transversely of the housing and free to roll back and forth therein, a bearing for the roll in the bottom of the housing, and an external member having a bearing surface to engage the roll at a point diametrically opposite that engaged by the bottom of the housing and receive the pressure thereof, the roller having a depression in the form of a cone at each end, centering pins having conical ends, one on each side of the housing, alined with the axis of the roll and engaging the conical depressions, springs acting on each centering pin tending to force it inward to thereby maintain the roller near the center of the box and return it thereto when it leaves the center.

3. A side bearing consisting of an elongated housing, a roller extending transversely of the housing and free to roll back and forth therein, a bearing for the roll in the bottom of the housing and an external member having a bearing surface to engage the roll at a point diametrically opposite that engaged by the bottom of the housing and receive the pressure thereof, the roller having a depression in the form of a cone at each end, centering pins having conical ends, one on each side of the housing alined with the axis of the roll and engaging the conical depressions, springs acting on each centering pin tending to force it inward to thereby maintain the roller near the center of the box and return it thereto when it leaves the center.

4. In a roller side bearing, a roller with concave ends and correspondingly formed convex members engaging the concavities and a spring engaging one of said convex members, forcing it inward against the roll to center it.

Signed by me at Baltimore city, State of Maryland, this 16th day of November 1912.

THOMAS H. SYMINGTON.

Witnesses:
  W. G. HOFFMAN, Jr.,
  I. O. WRIGHT.